United States Patent
Fox

(10) Patent No.: US 6,804,868 B2
(45) Date of Patent: Oct. 19, 2004

(54) SWIVEL LOCKING CLASP

(76) Inventor: Beverly Fox, 17446 Meadow Lake Cir., Fort Myers, FL (US) 33912

(*) Notice: Subject to any disclaimer, the term of this patent is extended or adjusted under 35 U.S.C. 154(b) by 58 days.

(21) Appl. No.: 10/348,534

(22) Filed: Jan. 17, 2003

(65) Prior Publication Data

US 2004/0139586 A1 Jul. 22, 2004

(51) Int. Cl.⁷ .......................... A44B 11/25; A45F 5/02; F16B 45/02
(52) U.S. Cl. ...................... 24/701; 24/574.1; 24/598.5; 24/598.9; 24/599.1; 24/265 WS; 24/116 A; 70/459
(58) Field of Search .................. 24/701, 702, 265 WS, 24/583, 116 A, 666, 68 J, 70 J, 69 J, 71 J, 598.5, 598.9, 574.1, 609; 70/459

(56) References Cited

U.S. PATENT DOCUMENTS

| | | | |
|---|---|---|---|
| 67,448 A | 8/1867 | Payne | |
| 359,459 A | 3/1887 | Moore | |
| 400,511 A | 4/1889 | Tainer-Noble | |
| 1,459,670 A | 6/1923 | Brown | |
| 1,461,306 A * | 7/1923 | Campbell | 24/598.9 |
| 1,472,038 A * | 10/1923 | Banes | 24/598.5 |
| 3,404,440 A * | 10/1968 | Weiss | 24/265 WS |
| 3,950,828 A * | 4/1976 | Szamborski | 24/599.1 |
| 4,193,278 A * | 3/1980 | Martinez | 70/459 |
| 4,369,552 A * | 1/1983 | Gottlieb | 24/701 |
| 4,539,736 A * | 9/1985 | Yokosuka | 24/265 WS |
| 4,745,667 A * | 5/1988 | Conte | 24/116 A |
| 4,993,127 A | 2/1991 | Mechem et al. | |
| 4,998,330 A | 3/1991 | D'Amore, Jr. | |
| 5,586,374 A * | 12/1996 | Nishida | 24/599.8 |
| 6,308,385 B1 * | 10/2001 | Ball | 24/574.1 |

* cited by examiner

Primary Examiner—Victor Sakran
(74) Attorney, Agent, or Firm—Edward M. Livingston

(57) ABSTRACT

A locking clasp (1) has a planar clasp body (3) an aperture (13), a swivel cover (12) rivetably mounted on a top surface and an interconnecting link having a plate (8) of the same size and shape as the aperture. When the plate on the interlocking link is inserted into the aperture of the clasp body and the swivel cover is rotated over the plate, the clasp provides a secure, aesthetic, all-pleasing and easy to use clasp for jewelry and other uses.

19 Claims, 2 Drawing Sheets

SWIVEL LOCKING CLASP

BACKGROUND OF THE INVENTION

This invention relates to a clasp used to secure two (2) ends of a flexible loop, and more particularly a swivel locking clasp primarily for jewelry such as bracelets.

Jewelry, particularly linked jewelry, such as bracelets, are normally secured around a person's wist or neck by a clasp on interlocking links. One problem with link jewelry is that the clasp often inadvertently or accidently disconnects causing the jewelry to fall off and become lost. In attempts to solve this, problem, some designers have developed complicated and difficult to manipulate, often unreliable and non-aesthetic locks.

Thus, there exists a need for a locking clasp that offers security, comfort beauty, and simplicity of use.

The prior art includes the following patents:

| U.S. PAT. NO.: | INVENTOR: | ISSUE DATE: |
| --- | --- | --- |
| 400,511 | Tainter & Noble | Apr. 02, 1889 |
| Des 359,459 | Moore | Mar. 15, 1887 |
| Des 67,448 | Payne | Aug. 06, 1867 |
| 1,459,670 | Brown | Jun. 19, 1923 |
| 4,998,330 | D'Amore, Jr. | Mar. 12, 1991 |
| 4,993,127 | Mechem, et al. | Feb. 19, 1991 |

Although the above patents show various locking clasp mechanisms for jewelry and other purposes, none combines all the features of the present device.

SUMMARY OF THE INVENTION

The primary object of the present invention is to provide a locking clasp that provides security against inadvertent and accidental opening which could result In the loss of jewelry or other items employing the clasp.

Another object of the present invention is to provide such a clasp that is easy to use.

A further object of the present invention is to provide such a clasp that is aesthetic.

An even further object of the present invention is to provide a clasp that is comfortable to wear.

The present invention fulfills the above and other objects by providing a locking clasp for jewelry having three main components: planar clasp body having an aperture therein, an interlocking link having a plate of the same size and shape as the aperture in the clasp body, extending from an elongated bar which is connected at the opposite end to an adjacent link of the jewelry; and a cover which is swivelably attached to the top surface of the clasp body. When the interlocking link is inserted into the aperture so that the plate rests within the aperture, the cover plate can be swiveled over the plate of the interlocking link to prevent the plate from falling from the aperture. The cover is swivelably attached to the top surface of the clasp body by a rivet. A bottom surface of the clasp body has rest plates for the interlocking link plates, surrounding and partially overlapping the aperture. The shape of the aperture in the clasp body and the plate on the interlocking link can take a variety of shapes, oval, circular, diamond, square, rectangular, and so forth. The cover on the clasp body may also take a variety of shapes and can be different in shape and size tin the plate on the interlocking link, as it is necessary that the cover only covers a sufficient portion of the plate on the interlocking link to prevent

SUMMARY OF THE INVENTION

The primary object of the present invention is to provide a locking clasp that provides security against inadvertent and accidental opening which could result in the loss of jewelry or other items employing the clasp.

Another object of the present invention is to provide such a clasp that is easy to use.

A further object of the present invention is to provide such a clasp that is aesthetic.

An even further object of the present invention is to provide a clasp that is comfortable to wear.

The present invention fulfills the above and other objects by providing a locking clasp for jewelry having three main components: planar clasp body having an aperture therein, an interlocking link having a plate of the same size and shape as the aperture in the clasp body, extending from an elongated bar which is connected at the opposite end to an adjacent link of the jewelry; and a cover which is swivelably attached to the top surface of the clasp body. When the interlocking link is inserted into the aperture so that the plate rests within the aperture, the cover plate can be swiveled over the plate of the interlocking link to prevent the plate from falling from the aperture. The cover is swivelably attached to the top surface of the clasp body by a rivet. A bottom surface of the clasp body has rest plates for the interlocking link plates, surrounding and partially overlapping the aperture. The shape of the aperture in the clasp body and the plate on the interlocking link can take a variety of shapes, oval, circular, diamond, square, rectangular, and so forth. The cover on the clasp body may also take a variety of shapes and can be different in shape and size than the plate on the interlocking link, as it is necessary that the cover only covers a sufficient portion of the plate on the interlocking link to prevent the interlocking link plate from falling out of the aperture during wear. The bottom surface of the clasp body may have a channel for holding the connecting bar on the interlocking link from lateral movement when the plate is in the aperture or clasp body.

A method for using the locking clasp of this invention involves inserting the plate on the interlocking link into the aperture of the clasp body from the bottom of the body and moving it so that the plate rests within the aperture. Then, the cover can be swiveled over the plate of the interlocking link to prevent the plate from falling out of the aperture.

The above and other objects, features and advantages of the present invention should become even more readily apparent to those skilled in the art upon a reading of the following detailed description in conjunction with the drawing wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
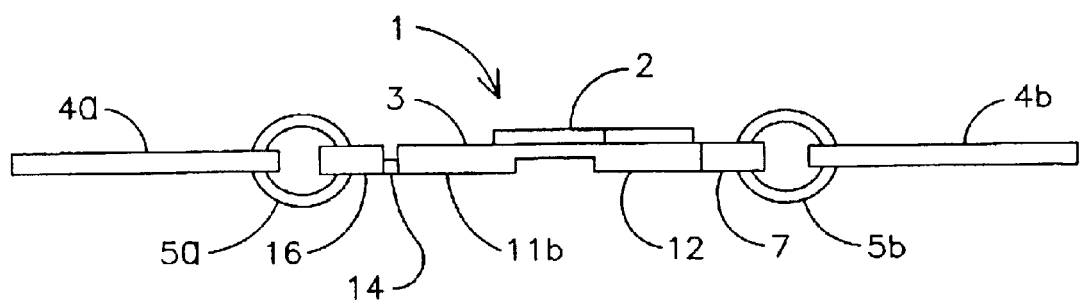
FIG. 1 is a partial side view of a linked jewelry bracelet employing the locking clasp of the present invention.

For purposes of describing the preferred embodiment, the terminology used in reference to the numbered components in the drawings is as follows:

| | |
|---|---|
| 1. | Locking clasp, generally |
| 2. | Swivel cover |
| 3. | Clasp body |
| 4.a, b | Adjacent links |
| 5.a, b | Connecting jump rings for adjacent links |
| 6. | Connective bar |
| 7. | Body jump ring connection |
| 8. | Interlocking plate |
| 9. | Jump ring hole for 5a |
| 10. | Jump ring hole for 5b |
| 11.a, b | aft side plate rests |
| 12. | Forward plate rest |
| 13. | Body aperture |
| 14. | Interlocking insert |
| 15. | Channel |
| 16. | Jump ring connector on interlocking link |
| 17. | Swivel cover rivet |

FIG. 1 shows the locking clasp 1 of the present invention as it would be used to connect an item of jewelry, such as a bracelet or necklace around the wrist or neck of a person. The locking clasp 1 essentially consists of three components: a clasp body 3, a swivel cover 2, and a interlocking insert 14. When the locking clasp 1 is used to connect the ends of a bracelet, the clasp body 3 is attached on one end to an adjacent link 4b by a jump ring 5b through a hole 10 in the jump ring connection 7 on the clasp body 3.

On the other end of the bracelet, the locking clasp 1 is secured to an adjacent link 4a by a jump ring 5a inserted through a hole 9 in a jump ring connector 16 on the interlocking insert 14 of the invention.

Figure 2:
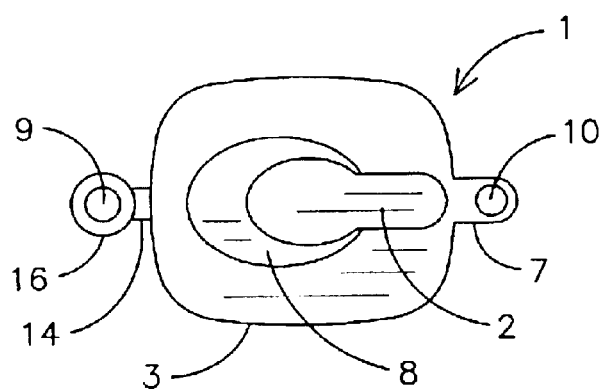
FIG. 2 is a top view of the locking clasp of the present invention in a fastened or locked configuration.

In FIG. 2 the locking clasp 1 is shown as having a clasp body 3, a swivel cover 2 and an interlocking insert 14 The interlocking plate 8 is shown under the swivel cover 2. The interlocking plate 8 has the same size and shape as the body aperture 13 shown in FIG. 4. Although the shape of the aperture 13 and plate 8 are shown in the drawings as oval, the aperture 13 and plate 8 could have any matching size and shape, such as circular, diamond-cut, rectangular, triangular, and so forth.

Figure 3:
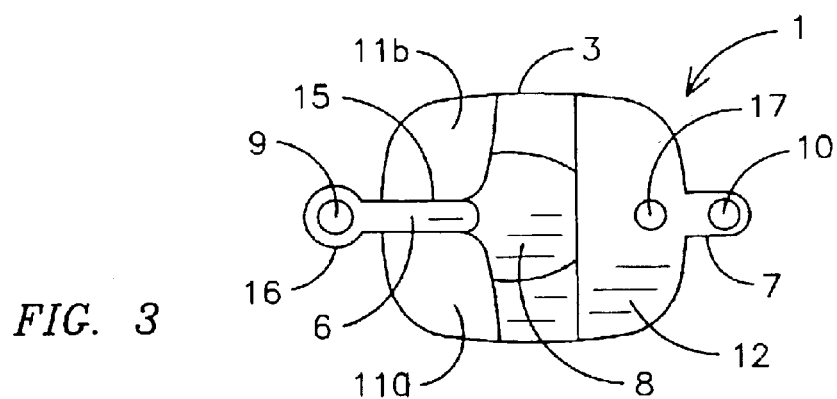
FIG. 3 is a bottom view of the locking clasp of the present invention in a fastened or locked configuration.

FIG. 3 shows, the locking clasp of FIG. 2 from the bottom. Additional components shown in this view not discussed previously consist of the connective bar 6, which fits into a channel 15 between aftside plate rests 11a,b which help prevent lateral movement of the interlocking insert 14. A forward plate rest, 12 keeps the toe of the interlocking insert plate 8 from moving downward. The aft side and forward plate rests 11a,b and 12 are formed by soldering or casting, an additional layer of material on the bottom surface of the clasp body 3. Also shown in FIG. 3 is the bottom of the swivel cover rivet 17 which is rotatable so that the swivel cover 2 may swivel as necessary to lock and unlock the clasp.

Figure 4:
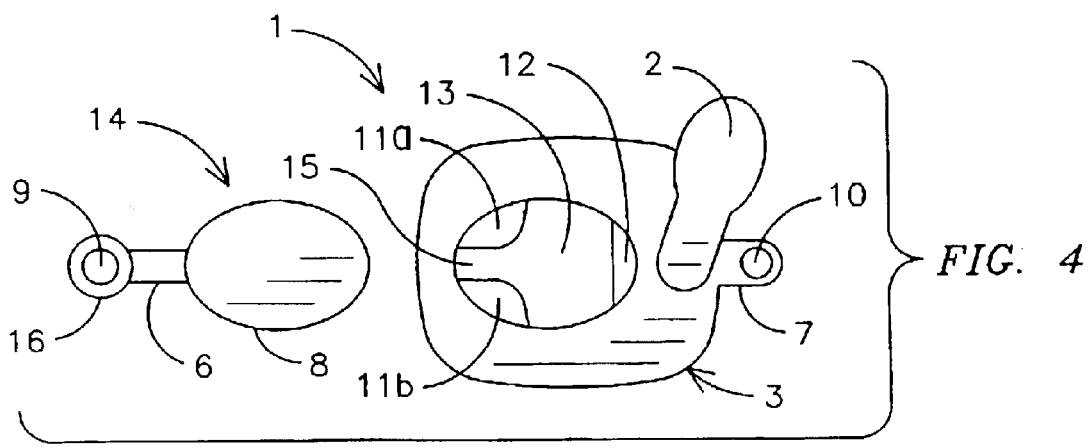
FIG. 4 is a top view of the locking clasp of the present invention in an unfastened or unlocked configuration.
Figure 5:
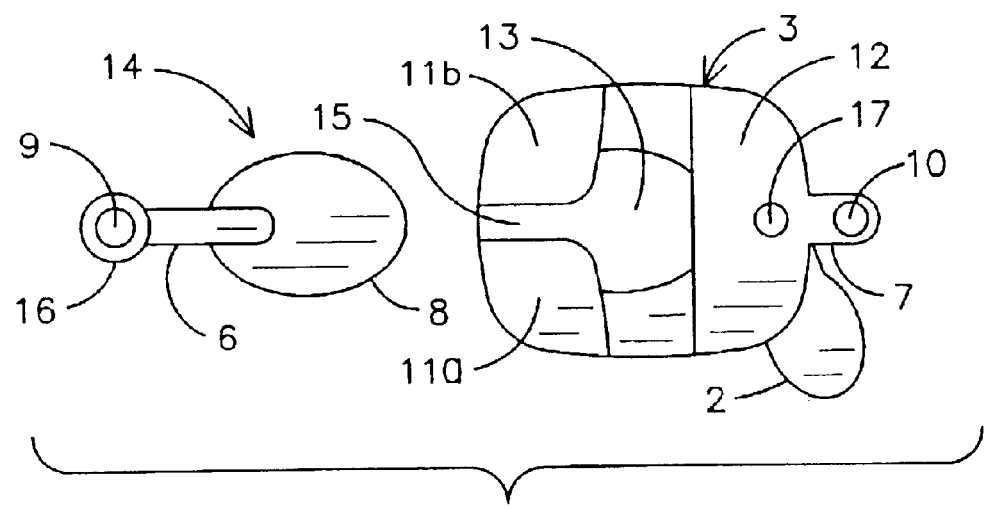
FIG. 5 is a bottom view of the locking clasp of the present invention in an unfastened or unlocked configuration.

In FIG. 4 and FIG. 5 the locking clasp 1 is shown in an unlocked or unfastened configuration wherein the swivel plate 2 has been swiveled or rotated laterally from over the plate 8 so the interlocking insert 14 can be removed from the hole 13.

Figure 6:
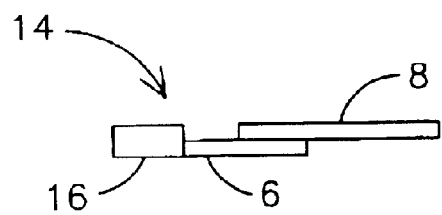
FIG. 6 is a side view of the interlocking link of the present invention.

As shown in the side view of FIG. 6, the interlocking insert 14 has three sections, the plate insert 8, the connective bar 6, and the jump ring connector 16.

Figure 7:
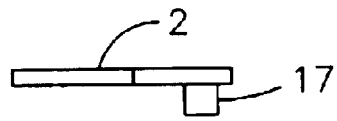
FIG. 7 is a side view of the swivel cover of the present invention.

FIG. 7 shows the cover plate 2 by itself with the rivets 17.

Figure 8:
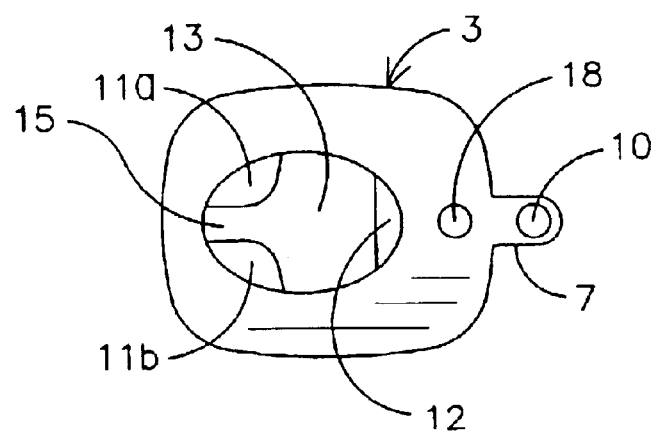
FIG. 8 is a top view of the clasp body without the swivel cover.

In FIG. 8 the clasp body 3 itself is shown to have an aperture 13 into which the rivet 17 for the swivel cover 2 is inserted. Also shown is the channel 15 for holding the connective bar 6 of the interlocking insert 14. The insert plate 8 rests on top of the aftside plate rests 11a,b and the forward plate rest 12 when the plate 8 is inserted into the clasp body aperture 13. Finally, by the jump ring connector 7 is shown containing a hole 10 for connecting a jump ring loop.

Although the primary use of the locking clasp of the present invention is to connect linked jewelry, such as bracelets and necklaces, die locking clasp present invention could be used for other inventions as well such as a locking clasp for a belt, a strap, and so forth.

An easy to use, effective, aesthetic and all-pleasing locking clasp having been described herein, the present invention is intended to cover any improvements, modifications, and variations within the scope or equivalent of the claims.

Having thus described my invention, I claim:

1. A locking clasp comprising:
   a clasp body having a connecting end and an interlocking end, a top surface and a bottom surface with an aperture there through;
   at least one rest plate located on said bottom surface of said clasp body:
   an interlocking link having a plate on one end, said plate having a size and shape matching the aperture in the clasp body, said plate being mounted on an elongated connecting bar which is attached to a jump ring connector on an opposite end of the interlocking link; and
   a cover having a swivel end and a pivot end on the top surface of the clasp body for swiveling over at least a portion of the plate on the interlocking link when it is inserted into the aperture of the clasp body to prevent the plate from falling out of the aperture.

2. The locking clasp of claim 1 wherein the cover plate is swivelably connected at one pivot end to the clasp body by a rivet rotatably mounted in the clasp body.

3. The locking clasp claim 1 wherein the shape of the aperture in the clasp body and the plate on the interlocking link is oval.

4. The locking clasp claim 1 wherein the shape of the aperture in the clasp body and the plate on the interlocking link is circular.

5. The locking clasp claim 1 wherein the shape of the aperture in the clasp body and the plate on the interlocking link is diamond shaped.

6. The locking clasp claim 1 wherein the shape of the aperture in the clasp body and the plate on the interlocking link is square.

7. The locking clasp claim 1 wherein the shape of the aperture in the clasp body and the plate on the interlocking link is rectangular.

8. The locking clasp claim 1 wherein the shape of the aperture in the clasp body and the plate on the interlocking link is heart-shaped.

9. The locking clasp of claim 1 wherein the cover is oval.

10. The locking clasp of claim 1 wherein the cover is circular.

11. The locking clasp of claim 1 wherein the cover is diamond shaped.

12. The locking clasp of claim 1 wherein the cover is square.

13. The locking clasp of claim 1 wherein the cover is rectangular.

14. The locking clasp of claim 1 wherein the cover is heart-shaped.

15. The locking clasp of claim 1 wherein said at least one rest plate partially overlaps an inside of a periphery of the aperture.

16. The locking clasp of claim 15 wherein said at least one rest plate comprises two aftside rests on sides of the interlocking end to provide a channel for holding the connecting bar of the interlocking insert between them to prevent lateral movement of the plate.

17. The locking clasp of claim 15 wherein said at least one rest plate comprises a rest on a forward side of the aperture to keep a forward end of the plate from rotating downward when the plate is inserted into the aperture of the clasp body.

18. The locking clasp of claim 16 further comprising a rest on a forward side of the aperture to keep a forward end of the plate from rotating downward when the plate is inserted into the aperture of the clasp body.

19. A method of using a locking clasp having a clasp body having a connecting end and an interlocking end, a top surface and a bottom surface with an aperture there through; at least one rest plate located on said bottom surface of said clasp body; an interlocking link having a plate on one end, said plate having a size and shape matching the aperture in the clasp body, said plate being mounted on an elongated connecting bar which is attached to a jump ring connector on an opposite end of the interlocking link; and a cover having a swivel end and a pivot end on the top surface of the clasp body for swiveling over at least a portion of the plate on the interlocking link when it is inserted into the aperture of the clasp body to prevent the plate from falling out of the aperture, said method comprising the steps of:

a: inserting the plate of the interlocking link into a bottom of the aperture of the clasp body so that the plate of the interlocking link rests planarly within the aperture; and b: swiveling the cover over the plate of the interlocking insert to lock the plate in the aperture of the clasp body.

* * * * *